Patented Mar. 14, 1944

2,344,004

UNITED STATES PATENT OFFICE 2,344,004

PROCESS FOR THE PREPARATION OF FERRIC OXIDE

Charles Georges Six, London, England, assignor to F. W. Berk and Company Limited, London, England No Drawing. Application April 12, 1943, Serial No. 482,825. In Great Britain April 20, 1942

5 Claims. (Cl. 23—200)

This invention relates to the manufacture of ferric oxide.

It is an object of the present invention to manufacture ferric oxide of high purity from cheap raw material.

With this object in view the present invention provides a process for the manufacture of ferric oxide of high purity wherein an oxide or sulphide ore of iron or mill scale is reacted with nitric acid to form ferric nitrate which is thereafter decomposed into ferric oxide and nitric acid by heating at a temperature of between 125 and 200° C.

It is preferred to use oxide ores such as haematite or magnetite or mill scale as the sulphide ores tend to produce oxides of nitrogen on reaction with the nitric acid, and also produce sulphates which are difficult to remove.

The easiest crystals of ferric nitrate to prepare have the formula $Fe_2(NO_3)_6.18H_2O$ and these can be grown to suitable size and hardness for separation from the mother liquor whilst the acid formed by its decomposition is of a suitable concentration for treatment of fresh ore.

The concentration of the acid and the temperature of reaction will vary with the nature of the ore and also, since the process is continuous, with the hydrate used for crystallising. However, with high quality haematite or magnetite the best results are obtained with nitric acid of specific gravity 1.3 to 1.4, and reacting at the boiling point of the acid.

The decomposition of the molten hydrates begins at about 125° C., and at 150° C. the decomposition is rapid. Up to 200° C. there is no great evolution of nitric fumes. The best efficiency is obtained with the lowest temperature required for decomposition.

The decomposition of the crystals does not follow the generally accepted equation:

$$2Fe_2(NO_3)_6 = 2Fe_2O_3 + 12NO_2 + 3O_2$$

but essentially the equation:

$$Fe_2(NO_3)_6 + 3H_2O = Fe_2O_3 + 6HNO_3$$

According to a preferred embodiment the process of the invention is carried out as follows:

The iron ore and the nitric acid are heated together in a digester under a reflux condenser the upper end of which is connected to an absorption tower through which air and the absorbing solution is passed; this is to recover any nitric fumes formed.

When the reaction is sufficiently advanced the whole charge is run into a filter or hydro-extractor, centrifuge or the like to separate silica and other insoluble impurities. The clear liquor then passes to a crystalliser, the crystals of ferric nitrate ($Fe_2(NO_3)_6.18H_2O$) are separated in a separator, the mother liquor being sent to the main storage tank for re-use. The crystals may at this stage be re-dissolved in nitric acid for re-crystallisation. The crystals are transferred to a decomposer where ferric oxide is formed and the nitric acid condensed and sent to a main storage tank. Any nitrous or nitric fumes formed are recovered in an absorption tower.

Using a magnetite ore of the following analysis:

| | Per cent |
|---|---|
| $Fe_3O_4$ | 91.78 |
| $Fe_2O_3$ | Nil |
| FeO | Nil |
| $SiO_2$ | 7.05 |
| $MnO_2$ | 0.12 |
| P | 0.009 |
| S | 0.019 |
| CaO | 0.45 |
| MgO | 0.30 |
| $Al_2O_3$ | 0.22 |
| NaCl | 0.26 | a ferric oxide was prepared containing the following impurities:

| | Per cent |
|---|---|
| $Fe_3O_4$ | Trace |
| FeO | Trace |
| $SiO_2$ | 0.01 |
| $MnO_2$ | 0.01 |
| P | Nil |
| S | Nil |
| CaO | Nil |
| MgO | Nil |
| $Al_2O_3$ | Nil |

The loading weight of the ferric oxide can be regulated by the type of decomposer used and the temperature of decomposition of the nitrate.

The process of the present invention has the advantages that it enables ferric oxide of high purity to be produced from cheap raw materials and with efficient recovery of the nitric acid used.

I claim:

1. A process for the manufacture of ferric oxide of high purity which comprises reacting an iron containing material selected from the group consisting of oxide and sulphide ores of iron and mill scale with nitric acid to form ferric nitrate and decomposing the ferric nitrate into ferric oxide and nitric acid by heating at a temperature of between 125 and 200° C.

2. A process for the manufacture of ferric oxide of high purity which comprises reacting an iron containing material selected from the group consisting of oxide and sulphide ores of iron and mill scale with nitric acid to form ferric nitrate, crystallising the ferric nitrate from the solution formed as a ferric nitrate hydrate of the formula $Fe_2(NO_3)_6.18H_2O$, separating the crystals from the solution and decomposing them into ferric oxide and nitric acid by heating at a temperature of between 125 and 200° C.

3. A process for the manufacture of ferric oxide of high purity which comprises reacting haematite with nitric acid of a specific gravity of between 1.3 and 1.4 to form ferric nitrate and decomposing the ferric nitrate into ferric oxide and nitric acid by heating at a temperature of between 125 and 200° C.

4. A process for the manufacture of ferric oxide of high purity which comprises reacting magnetite with nitric acid to form ferric nitrate, crystallising the ferric nitrate from the solution formed as a ferric nitrate hydrate of the formula $Fe_2(NO_3)_6.18H_2O$, separating the crystals from the solution and decomposing them into ferric oxide and nitric acid by heating at a temperature of between 125 and 200° C.

5. A process for the manufacture of ferric oxide of high purity which comprises reacting magnetite with nitric acid of a specific gravity of between 1.3 and 1.4 to form ferric nitrate, crystallising the ferric nitrate from the solution formed as a ferric nitrate hydrate of the formula $Fe_2(NO_3)_6.18H_2O$, separating the crystals from the solution and decomposing them into ferric oxide and nitric acid by heating at a temperature of between 125 and 200° C.

CHARLES GEORGES SIX.